PROCESS FOR REDUCING IRON OXIDE ORE TO ITS METALLIC FORM
Filed Aug. 28, 1928
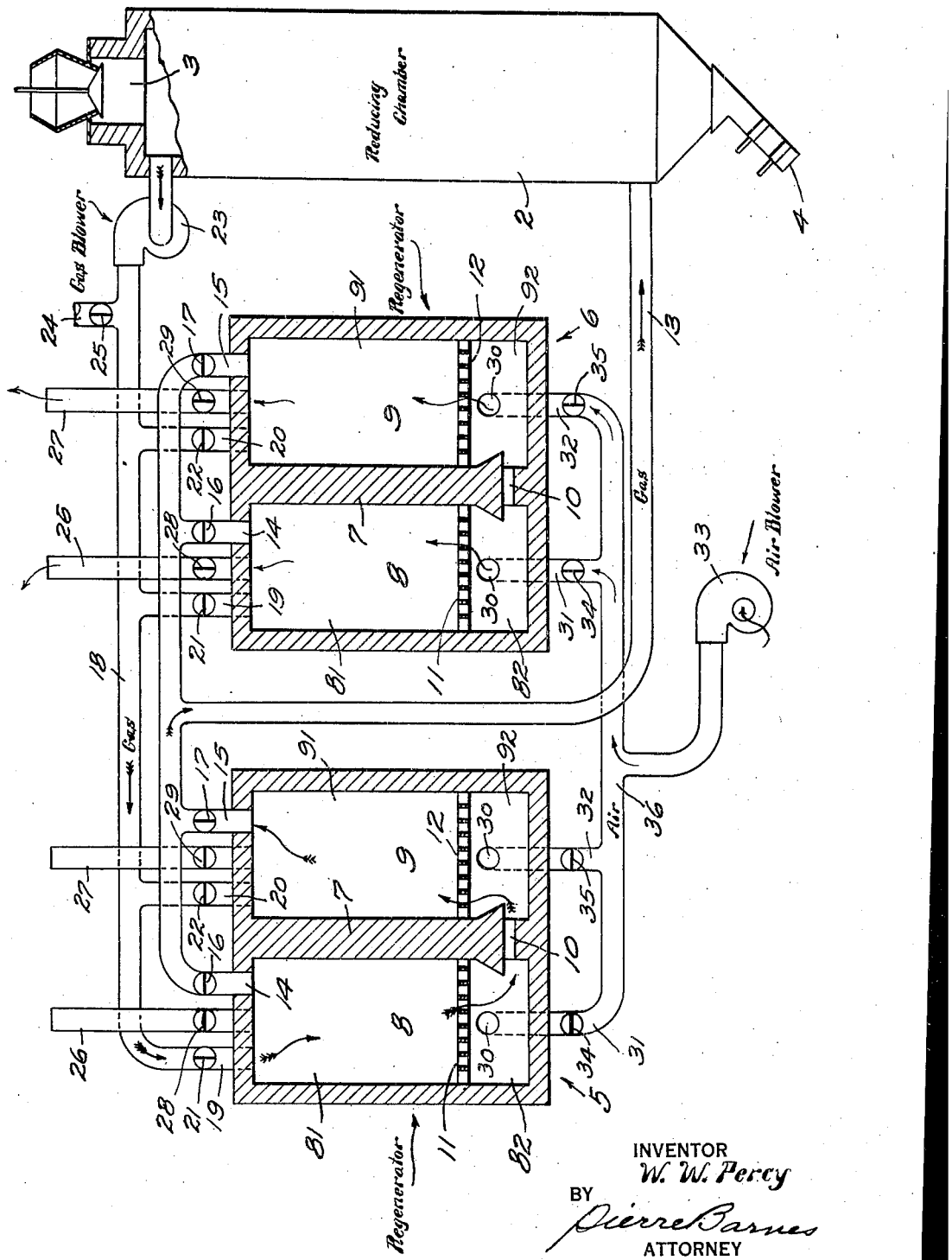
INVENTOR
W. W. Percy
BY
Pierre Barnes
ATTORNEY Patented June 21, 1932

1,863,804

UNITED STATES PATENT OFFICE

WILLIAM W. PERCY, OF SEATTLE, WASHINGTON

PROCESS FOR REDUCING IRON OXIDE ORE TO ITS METALLIC FORM

Application filed August 28, 1928. Serial No. 302,502.

This invention relates to a process of reducing iron oxide ores and, more especially, to improvements in the process disclosed in patent application Ser. No. 114,939, filed by me June 10, 1926, now Patent No. 1,792,507.

The object of my improvements, generally stated, is to simplify and expedite the deoxidizing of iron oxide ore in a more efficient and economical manner than hitherto.

A specific object of the invention is to provide apparatus wherein the regeneration of the reducing gases is attained by the use of coal, as well as coke.

Another specific object of the invention is to utilize a bi-cellular regenerator which permits the use of coal and the coking of the same in the process itself.

Other specific objects and advantages of the invention will appear in the following description.

Single-cell gas regenerators as heretofore used in reducing iron oxide ores have proven unsatisfactory mainly because the temperature of the gases, which are taken from the bottom of a regenerator, is below that required (between 900° C. and 1000° C.) for the proper treatment of the ore in the reducing chamber.

In the present invention a two-cell gas regenerator is employed. Each of the cells is provided intermediate its height with a grate for a bed of fuel—of from, say, three to five feet in depth—which are alternately replenished with small charges of fuel. The cells are connected so that, in a "run", the gases to be regenerated enter the regenerator at the top of one cell through which they descend and ascend through the other cell passing downwardly and upwardly through the successive fuel beds to leave the regenerator at the top of the second cell—the hottest part of the regenerator—and thus provide heat requisite to the reducing gases.

In the "blow" period air enters simultaneously the bottoms of both of the regenerator cells and travels upwardly through the respective fuel beds therein to be discharged through the cell stacks.

It will thus be seen that in run the gases must travel successively through both cells of the regenerator; while in blow the air travels coincidently through both cells, or in two streams for a distance one-half that traveled by the gases during the run.

The accompanying drawing illustrates in longitudinal vertical section apparatus for carrying out the present invention.

In said drawing, the reference numeral 2 represents a reducing furnace, or chamber as hereinafter termed, through the throat 3 at the upper end of which is supplied preheated ore; the reduced iron being withdrawn from the bottom of the chamber as through a gate-controlled spout 4.

I employ gas regenerators 5 and 6, two being shown. Each of said regenerators is divided as by a partition 7 into cells 8 and 9 which are communicatively connected adjacent the bottoms thereof by means of a passage 10.

At a short distance above said passage the respective cells of a regenerator have provided therein grates 11 and 12 which serve to divide the cells into upper and lower compartments 81, 82 and 91, 92, respectively. 13 is a gas conduit leading into the lower portion of the reducing chamber 2 and has branch inlets 14 and 15 which extend from the top of the upper compartments 81 and 91 of the cells of both regenerators, said inlets being provided with valves 16 and 17, respectively.

A conduit 18 for the return gases from said reducing chamber extends from the upper portion of the latter and is provided with branch outlets 19 and 20, extending into the top of the upper cell compartments 81 and 91 of said regenerators.

21 and 22 represent valves for the branches 19 and 20 of the return gas conduit 18.

Associated with the conduit 18 is a blower 23 and, to the opposite side of the latter from the reducing chamber, is provided a pipe 24 through which excess gases are discharged subject to the control of a valve 25. 26 and 27 represent conduits, or stacks, extending from the upper compartments 81 and 91 of the cells of both regenerators, said stacks being provided with valves 28 and 29, respectively. The lower compartments 82 and 92— that is, the spaces below the grates of the respective regenerator cells are connected, as at 30, to branches 31 and 32 of a pipe 36 through which air is supplied from a blower 33 into the regenerator cells selectively subject to the control of regulating valves 34 and 35 provided in said pipe branches 31 and 32, respectively.

In the cycle of operation, each of the regenerator cells contains a bed of fuel. Assuming that a generator has been cut out—that is, completed a run—and is about to be put into blow, a cell, as 8 for example, is supplied with a small additional charge of coal, whereupon air is forced through the cells—as indicated by the unfeathered arrows with respect to regenerator 6—to effect the heating of the recently charged coal as well as the other fuel.

The coal is thus caused to give off hydrocarbons as gas, but which distillation of the hydrocarbons will not have been completed at the termination of the blow. At the end of the blow (which is governed by the temperatures throughout the fuel bed) the regenerator is put into run, as represented with respect to the regenerator 5.

During said run the gases from the reducing chamber enter the regenerator 5 through its cell 8 and travel downwardly through the fuel bed on grate 11 passing into cell 9 and thence upwardly through the incandescent fuel on grate 12 to be delivered from the top of cell 9.

From which it will be seen that the distillation of the coal is commenced during the blow, and that the incoming gases to be regenerated carry the hydrocarbon gases downwardly through the fuel bed in cell 8 to continue the coking process in this cell.

At the end of said run period just described, fuel is charged into cell 9 of the regenerator 5 which is then put in blow (as represented with respect to the regenerator 6) both cells being blown simultaneously. Near the end of the second blow period of the regenerator 5 the cell 9 thereof receives a charge of coal and the regenerator put back into run. In this second run the gases enter cell 9 and travel downwardly therethrough into the bottom of cell 8 and thence upwardly to be returned from the top of cell 8 to the reducing chamber.

It will be seen from the foregoing that the coal charged into cell 8 has undergone two blow periods and one run period, during which time the coal has become coked, and that the cells of a regenerator are replenished by coal, alternately, at the ends of the successive runs.

In the coking process the volatile constituents of the coal exist as hydrocarbons and are liberated as gas. By coking the coal, moreover, in a regenerator I utilize the major portion of these hydrocarbons by causing the hydrocarbon gases to travel downwardly through the coal which has already undergone coking.

It is well known that when these hydrocarbon gases contact solid carbon at a temperature at 1000° C., the carbon is deposited as carbon and the hydrogen is liberated as free hydrogen. The hydrogen thus liberated enters the gas stream and becomes a reducing gas, while the deposited carbon builds up forming coke, in this way preventing the hydrocarbons from contaminating the reducing gases. Hydrocarbons act to cause an endothermic condition in the reducing chamber, exothermic reaction being essential to the effective operation.

It is to be noted that in my process I first coke additional small charges of coal and make use of the volatile portion of the coal driven off by a second cracking of the hydrocarbons forming free hydrogen and solid carbon.

In the improved method of regenerating the following reactions take place: first, a reaction of coking in which the hydrocarbons are expelled; second, a cracking of the hydrocarbons into free hydrogen and deposited carbon; and, third, a reaction of reduction and the regeneration of the gases after contact with the ore.

In this locality coke costs about $9.00 a ton, while coal costs approximately $3.00 a ton. Local coke contains approximately 20 per cent ash and approximately 77 per cent fixed carbon, the remaining 3 per cent being composed of sulphur and small amounts of hydrocarbons; while coal contains about 12 per cent ash, 50 per cent fixed carbon and 35 per cent volatile matter. The volatile matter consisting of about 15 per cent to 20 per cent hydrogen, or approximately 6 per cent of the coal is hydrogen.

As a reducing agent hydrogen has several advantages—first, as a de-sulphurizer; second, as a de-phosphorizer; and third, as a de-oxidizer. As a de-oxidizer two pounds of hydrogen absorb sixteen pounds of oxygen, or six times as much oxygen as carbon or carbon monoxide will absorb.

The coking of the coal in the regenerator and the subsequent cracking of the hydrocarbons is thought to be new in the art and renders possible the use of the hydrogen contents of fuel as a reducing agent inasmuch as the hydrogen contained in the hydrocarbon gases exists as free hydrogen after the cracking of the hydrocarbons.

What I claim, is,—

1. The process of reducing iron oxide ore, which comprises treating the ore in a reducing chamber to the action of highly heated carbon monoxide and free hydrogen reducing gases, conducting the used reducing gases in part or in whole successively through a coking coal fuel bed and a coked fuel bed in a two-cell hydro-carbon fueled regenerator for regenerating the same, and returning the regenerated gases to the reducing chamber, the gases to be regenerated being withdrawn from the upper portion of the reducing chamber and conducted to the upper portion of the regenerator, the regenerated gases being withdrawn from the upper portion of the regenerator and conducted into the lower portion of the reducing chamber.

2. In the process as defined in claim 1, wherein the course of the gases to be regenerated is downwardly through the coking coal fuel bed and upwardly through the coke fuel bed.

3. The process of reducing the iron in iron oxide to its metallic form, comprising the treating in a regenerator of the used reducing gases by passing said gases downwardly through a coking coal fuel bed, returning the gases to the top of the regenerator by passing through a coke fuel bed, and conducting the gases in a highly heated condition into the reducing chamber.

4. In the reducing of iron oxide ore, the method of regenerating the used reducing gases which consists in passing the gases in a run period through two fuel beds in opposite directions, replenishing said fuel beds with coal alternately, such added coal being converted into coke during the cycle of operation of the regenerator, and reversing the directions of the travel of the gases through the fuel beds in the successive runs of the regenerator.

5. In a process of reducing iron oxide ore, comprising the regenerating during a run period of the used reducing gases from a reducing chamber in a two-cell regenerator, each cell thereof containing a fuel bed, replenishing each of said fuel beds alternately with a charge of coal, regulating the direction of the flow of said gases to cause the same to pass downwardly through the coal replenished fuel bed in one of the cells and to pass upwardly through the fuel bed of the other cell and reconducting the gases to the reducing chamber, said run periods being effected intermittently with succeeding blow periods.

6. In the reduction of iron oxide ore, wherein is employed a two-cell gas regenerator, each of said cells containing a fuel bed, the process of replenishing the fuel beds alternately with a charge of coal, causing air in the blow to pass through both of said fuel beds in coking the charge of coal in one of said beds, then regenerating the used reducing gases by causing said gases to pass successively downwardly through the fuel bed including the coking coal and upwardly through the other fuel bed.

Signed at Seattle, Washington, this 17th day of August, 1928.

WILLIAM W. PERCY.